United States Patent
Weis et al.

(10) Patent No.: US 9,859,542 B2
(45) Date of Patent: Jan. 2, 2018

(54) BATTERY ELEMENT, A BATTERY AND A METHOD FOR FORMING A BATTERY

(71) Applicant: Infineon Technologies AG, Neubiberg (DE)

(72) Inventors: Rolf Weis, Dresden (DE); Marko Lemke, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 76 days.

(21) Appl. No.: 14/229,453

(22) Filed: Mar. 28, 2014

(65) Prior Publication Data
US 2015/0280198 A1    Oct. 1, 2015

(51) Int. Cl.
*H01M 2/18* (2006.01)
*H01M 2/16* (2006.01)
*H01M 2/10* (2006.01)
*H01M 4/131* (2010.01)
(Continued)

(52) U.S. Cl.
CPC ............... *H01M 2/18* (2013.01); *H01M 2/26* (2013.01); *H01M 4/386* (2013.01); *H01M 4/525* (2013.01);
(Continued)

(58) Field of Classification Search
CPC .......... H01M 2/18; H01M 2/26; H01M 4/386; H01M 4/525; H01M 4/583; H01M 4/587; H01M 4/664; H01M 10/052; H01M 10/562; H01M 10/058; H01M 2/1061; H01M 2/1077; H01M 4/131; H01M 4/133;
(Continued)

(56) References Cited

U.S. PATENT DOCUMENTS 6,495,283 B1    12/2002  Yoon et al.
7,959,769 B2 *   6/2011  Zhang ................... C23C 14/08
                                                204/192.12
(Continued)

FOREIGN PATENT DOCUMENTS

CN    102035029 A    4/2011
CN    103367680 A    10/2013
(Continued)

OTHER PUBLICATIONS

Baggetto, Loic et al., "High Energy Density All-Solid-State Batteries: A Challenging Concept Towards 3D Integration," Wiley InterScience, Advanced Functional Materials, vol. 18, CPEL1550642, www.afm-journals.de, Mar. 31, 2008, pp. 1057-1066.

(Continued)

*Primary Examiner* — Gregg Cantelmo
(74) *Attorney, Agent, or Firm* — Slater Matsil, LLP

(57) ABSTRACT

A battery element includes a substrate with a plurality of trenches extending into the substrate. At least a part of each trench of the plurality of trenches is filled with a solid state battery structure. Further, the battery element includes a front side battery element electrode arranged at a front side of the substrate and electrically connected to a first electrode layer of the solid state battery structures within the plurality of trenches. Additionally, the battery element includes a backside battery element electrode arranged at a backside of the substrate and electrically connected to a second electrode layer of the solid state battery structures within the plurality of trenches.

18 Claims, 13 Drawing Sheets

(51) Int. Cl.
| | |
|---|---|
| *H01M 4/133* | (2010.01) |
| *H01M 4/134* | (2010.01) |
| *H01M 4/38* | (2006.01) |
| *H01M 4/525* | (2010.01) |
| *H01M 4/583* | (2010.01) |
| *H01M 4/587* | (2010.01) |
| *H01M 4/66* | (2006.01) |
| *H01M 10/052* | (2010.01) |
| *H01M 10/0562* | (2010.01) |
| *H01M 10/058* | (2010.01) |
| *H01M 6/40* | (2006.01) |
| *H01M 2/26* | (2006.01) |

(52) U.S. Cl.
CPC ........... *H01M 4/583* (2013.01); *H01M 4/587* (2013.01); *H01M 4/664* (2013.01); *H01M 10/052* (2013.01); *H01M 10/058* (2013.01); *H01M 10/0562* (2013.01); *H01M 2/1061* (2013.01); *H01M 2/1077* (2013.01); *H01M 4/131* (2013.01); *H01M 4/133* (2013.01); *H01M 4/134* (2013.01); *H01M 6/40* (2013.01); *H01M 2220/20* (2013.01); *H01M 2300/0068* (2013.01); *Y02E 60/122* (2013.01); *Y02P 70/54* (2015.11); *Y02T 10/7011* (2013.01); *Y10T 29/49108* (2015.01)

(58) Field of Classification Search
CPC ............... H01M 6/40; H01M 2220/20; H01M 2300/0068; Y10T 29/49108; Y02P 70/54; Y02E 60/122; Y02T 10/7011
See application file for complete search history.

(56) References Cited

U.S. PATENT DOCUMENTS

| | | |
|---|---|---|
| 8,870,979 B2 | 10/2014 | Bouillon |
| 2006/0032046 A1* | 2/2006 | Nathan ................... C25D 9/04 29/623.5 |
| 2006/0154141 A1* | 7/2006 | Salot ................... H01M 4/0423 429/149 |
| 2007/0026309 A1* | 2/2007 | Notten ................... H01M 4/04 429/209 |
| 2009/0142656 A1* | 6/2009 | Nathan ............... H01M 2/0202 429/129 |
| 2011/0097623 A1* | 4/2011 | Marinis, Jr. ......... H01M 2/0285 429/163 |
| 2013/0230646 A1 | 9/2013 | Wallace et al. |
| 2013/0260183 A1 | 10/2013 | Ellis-Monaghan et al. |
| 2014/0038028 A1* | 2/2014 | Genard ............ H01M 10/0436 429/152 |

FOREIGN PATENT DOCUMENTS

| | | | | |
|---|---|---|---|---|
| IL | WO 2011154862 A1 * | 12/2011 | ............ | H01G 11/06 |
| WO | WO 2008023312 A2 * | 2/2008 | | |
| WO | 2010007579 A1 | 1/2010 | | |

OTHER PUBLICATIONS

Notten, Peter et al., "3-D Integrated All-Solid-State Rechargeable Batteries," Wiley-VCH, Advanced Materials, www.advmat.de, CPEL1550642, vol. 19, Nov. 21, 2007, pp. 4564-4567.

* cited by examiner

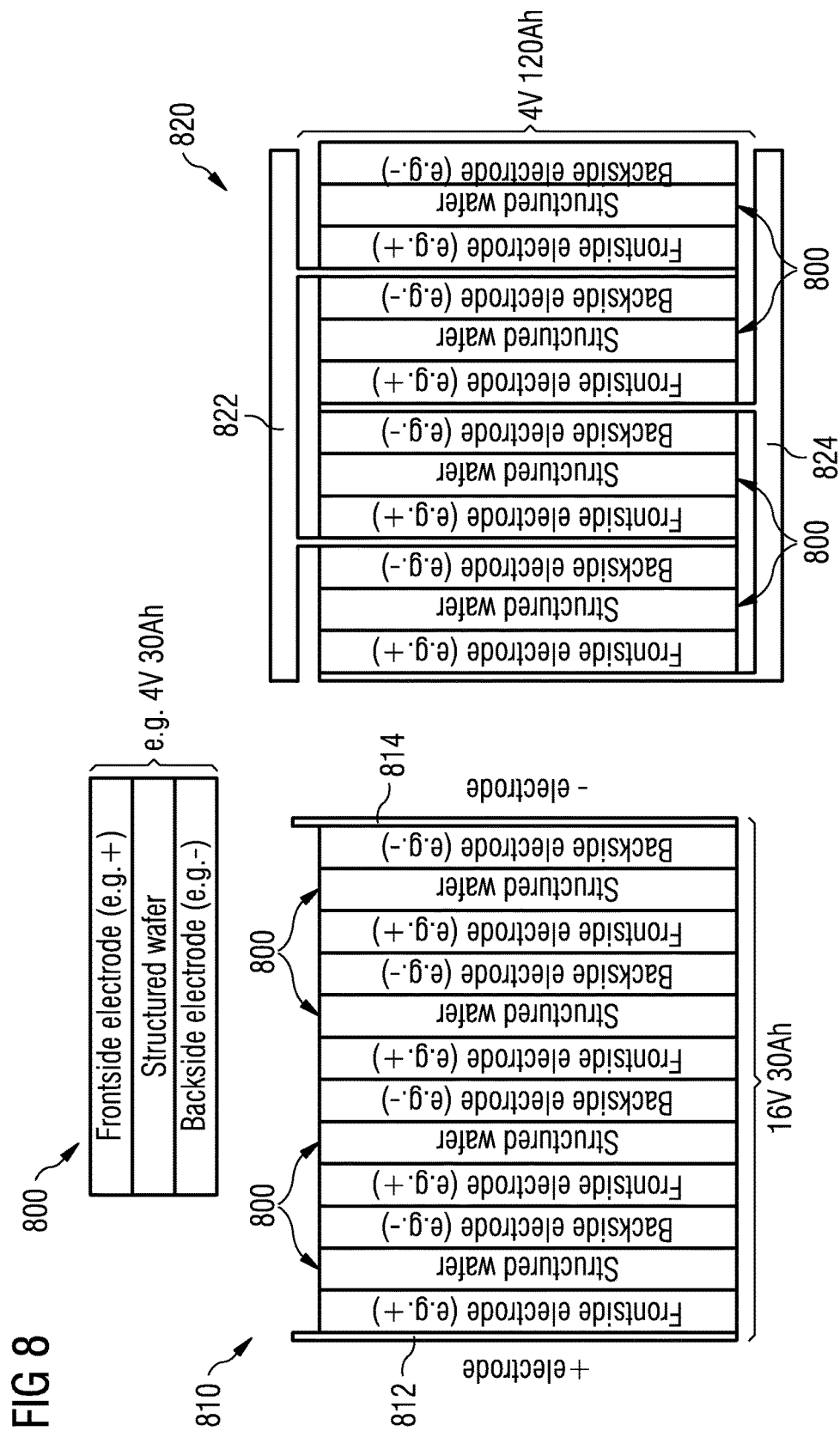

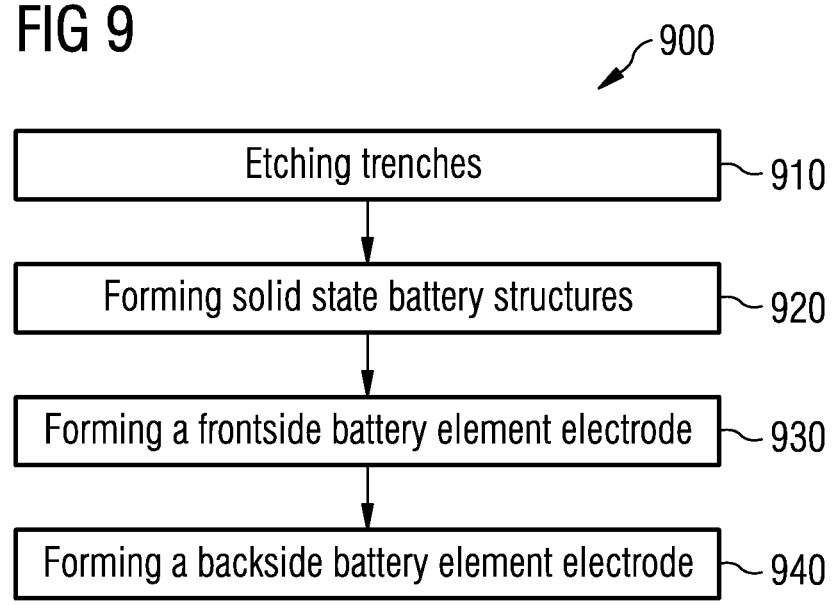

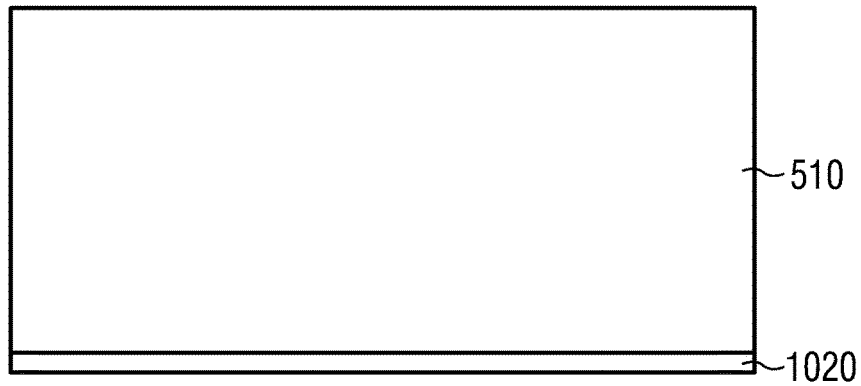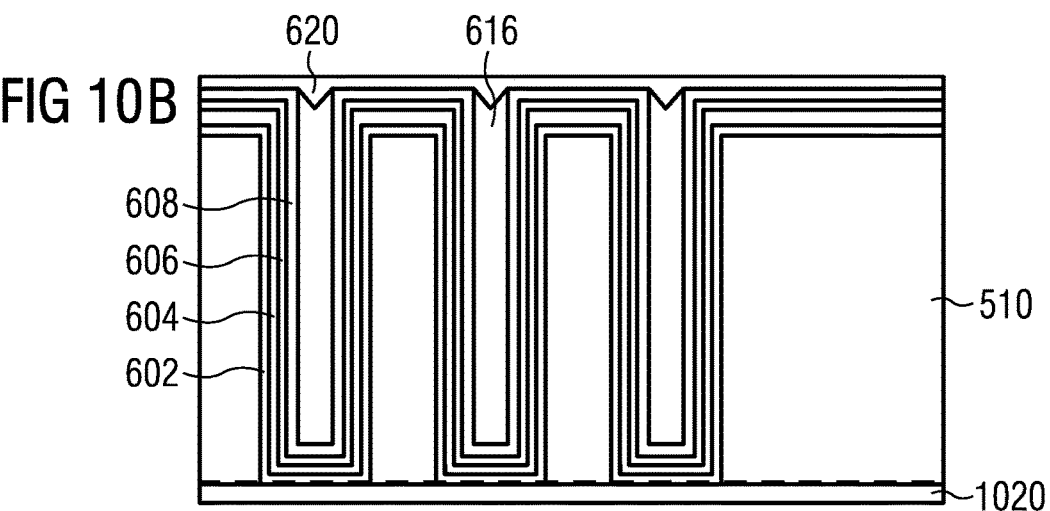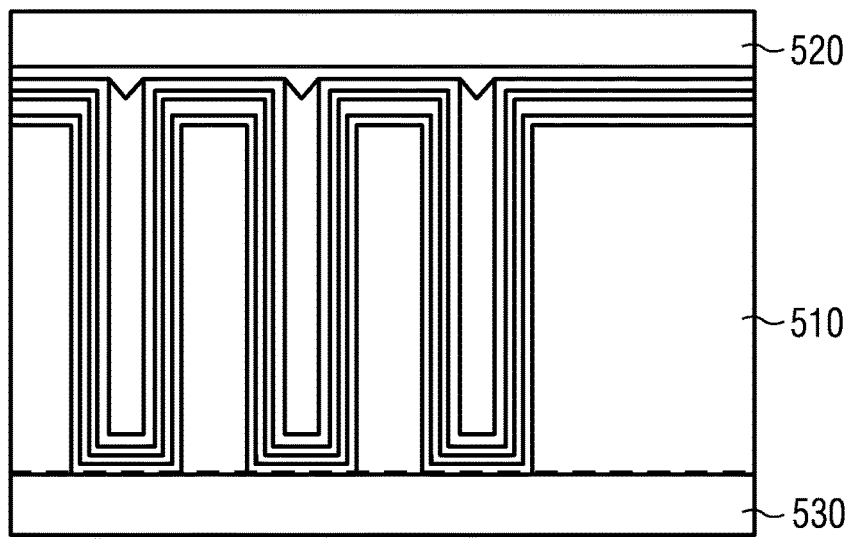

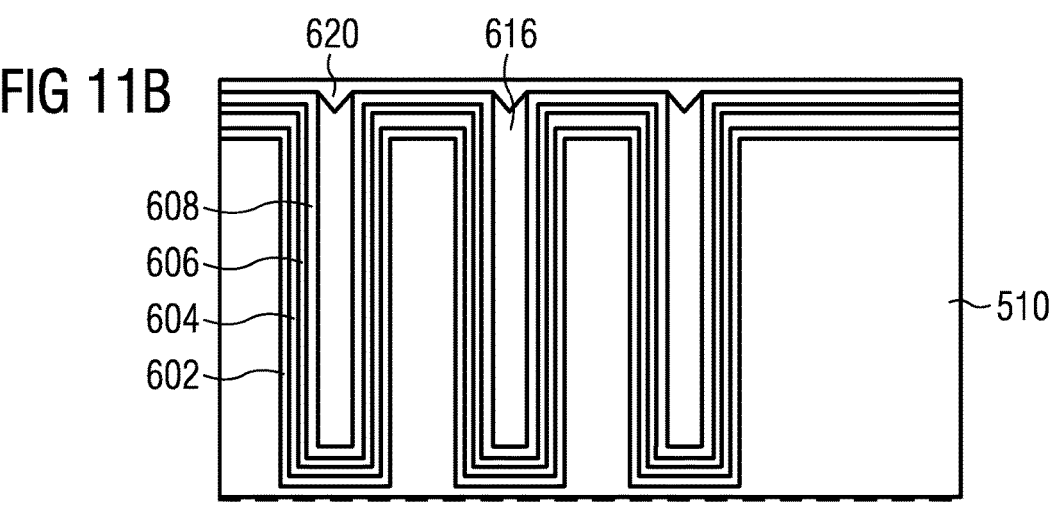
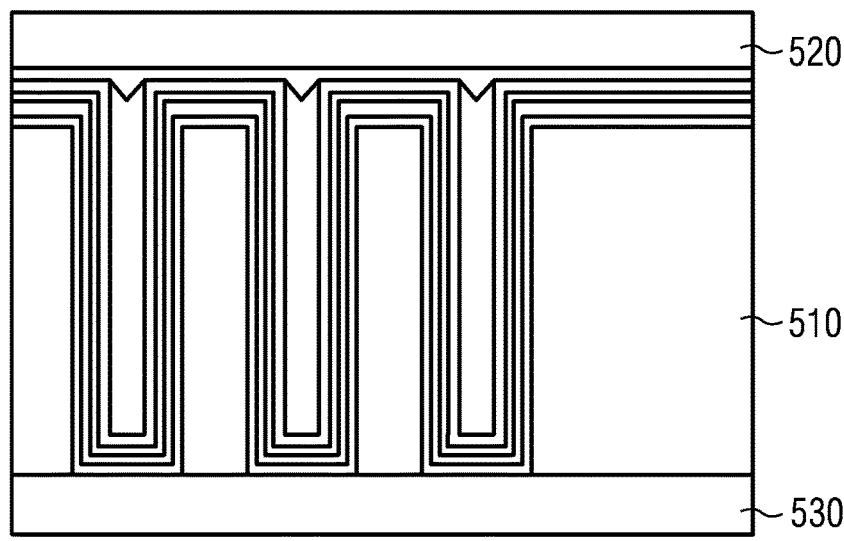

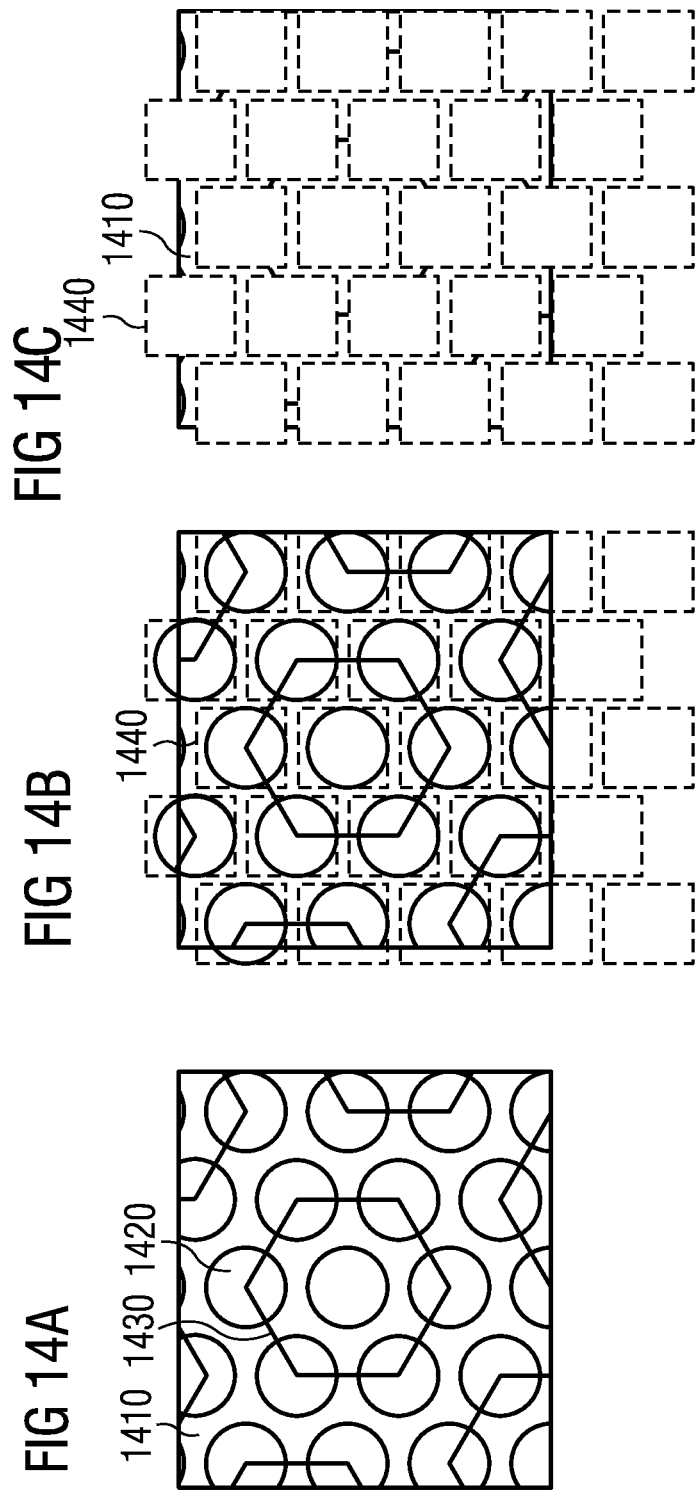

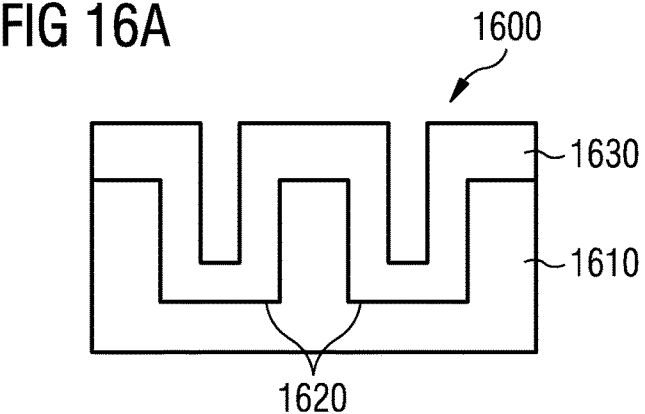
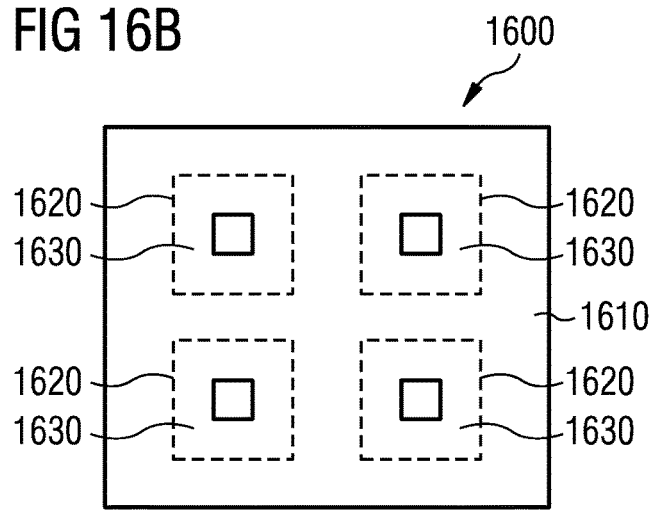
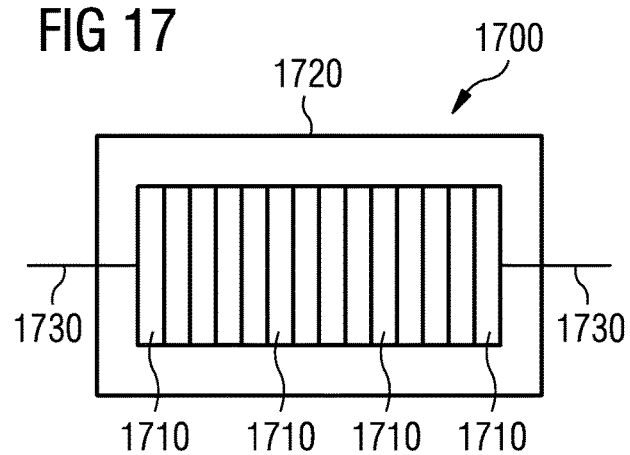

BATTERY ELEMENT, A BATTERY AND A METHOD FOR FORMING A BATTERY

TECHNICAL FIELD

Embodiments relate to energy storage devices and in particular to a battery, a battery element and a method for forming a battery.

BACKGROUND

With the increased use of portable electronic devices such as notebooks, portable telephones, cameras and others and with the increased use of electrically-driven automobiles, secondary or rechargeable batteries with high energy density have received increasing attention as a power source for these devices. Examples of such rechargeable batteries are lithium ion rechargeable batteries.

The demand for energy storage devices is further growing due to a growing production volume for electric vehicles and growing demand to store energy (e.g., renewable energy).

Energy density, i.e., how much energy can be stored in a battery, is important to reduce the weight and therefore the cost of battery materials and cost of battery movement. Therefore, it is of general interest to increase the energy density of batteries.

SUMMARY OF THE INVENTION

Some embodiments relate to a battery element comprising a substrate with a plurality of trenches reaching into the substrate. At least a part of each trench of the plurality of trenches is filled with a solid state battery structure. Further, the battery element comprises a front side battery element electrode arranged at a front side of the substrate and electrically connected to a first electrode layer of the solid state battery structures within the plurality of trenches. Additionally, the battery element comprises a backside battery element electrode arranged at a backside of the substrate and electrically connected to a second electrode layer of the solid state battery structures within the plurality of trenches.

Further embodiments relate to a method for forming a battery comprising etching trenches into a substrate and forming a solid state battery structure within the trenches. Further, the method comprises forming a front side battery element electrode arranged at a front side of the substrate and electrically connected to a first electrode layer of the solid state battery structure within the trenches. Additionally, the method comprises forming a backside battery element electrode arranged at a backside of the substrate and electrically connected to a second electrode layer of the solid state battery structure within the trenches.

BRIEF DESCRIPTION OF THE DRAWINGS

Some embodiments of apparatuses and/or methods will be described in the following by way of example only, and with reference to the accompanying figures, in which

FIG. 8 shows schematic cross sections of battery element stacks;

FIG. 9 shows a flow chart of a method for forming a battery;

FIG. 10*a*-10*c* show schematic cross sections during forming a battery element;

FIG. 11*a*-11*c* show schematic cross sections during forming another battery element;

FIG. 14*a*-14*c* show schematic top views during forming another battery element;

FIG. 16*a* shows a schematic cross section of a battery element with quadratic trenches;

FIG. 16*b* shows a schematic top view of the battery element shown in FIG. 16*a*; and FIG. 17 shows a schematic cross section of a battery with a stack of battery elements.

DETAILED DESCRIPTION OF ILLUSTRATIVE EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
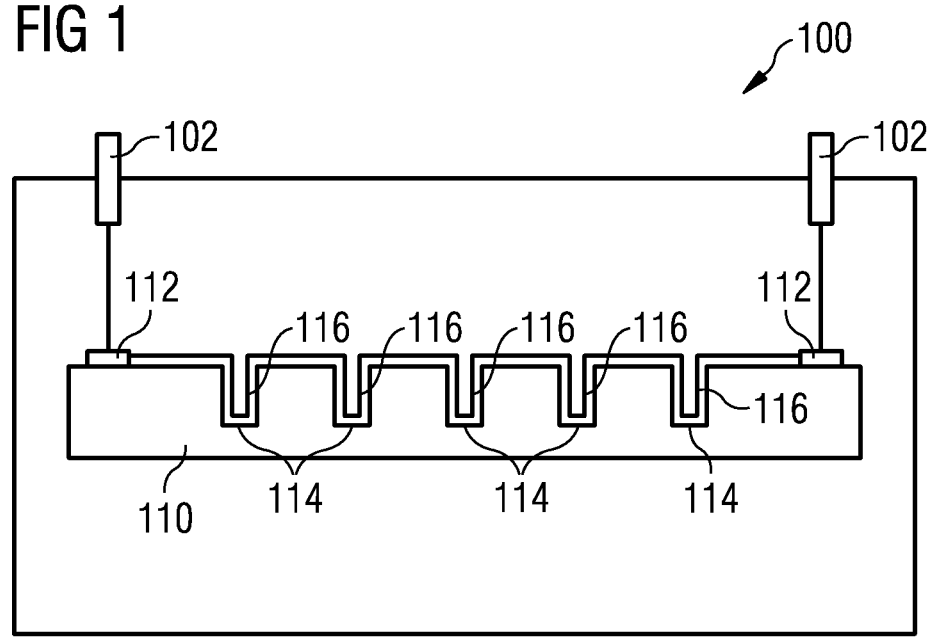
FIG. 1 shows a schematic cross section of a battery.

FIG. 1 shows a schematic cross section of a battery 100 according to an embodiment. The battery 100 comprises two externally accessible battery electrodes 102 to provide a supply voltage to a connectable device. Further, the battery 100 comprises at least more than half of a wafer 110 comprising two wafer electrodes 112. The battery 100 can be formed in a substrate having a main surface with a surface area of at least 600 cm². For example, if a 200 nm wafer (where the diameter is 200 nm) is used, at least a more than half of the wafer would be about this size (e.g., about $\pi R^2$). Using substantially all of a 200 nm wafer would produce a substrate of about 1200 cm² while using all of a 450 nm wafer would produce a substrate of about 6350 cm². Accordingly, in certain embodiments, the substrate size is between 1200 cm² and 6350 cm². In other embodiments, the substrate can be bigger or smaller.

The wafer comprises a plurality of trenches 114 reaching from a surface of the wafer 110 into the wafer 110. At least a part of a trench 114 (or of each trench) of the plurality of trenches 114 is filled with a solid state battery structure 116. The solid state battery structure 116 within the trench 114 comprises electrodes electrically connected to the wafer electrodes 112.

By using large parts of a wafer or the complete wafer directly for forming a battery, high energy densities may be reached with low cost, since a wafer can be handled in one piece during manufacturing. Further, no or only few space of the wafer may be lost for areas used for cutting the wafer. Further, the manufacturing time and costs for cutting the wafer can be kept low or may be completely avoided.

The battery 100 is a rechargeable battery (or a non-rechargeable battery) providing a supply voltage at the two externally accessible battery electrodes 102 (e.g., anode and cathode). An external device (e.g., electric vehicle, a power supply network, a machine or other electronic devices) may be connected to the two externally accessible battery electrodes 102. Further, an external energy generator or power supply network may be connected or connectable to the battery 100 for recharge.

For example, the two externally accessible battery electrodes 102 may reach through a package of the battery 100. The package may surround the at least more than half of a wafer 110 to protect the at least more than half of a wafer 110 against undesired environmental influences.

The at least more than half of a wafer 110 may be a large part (more than 50%, more than 70%, more than 80% or more than 90%) of a wafer or substantially a complete wafer comprising the two wafer electrodes 112. Using a complete wafer may provide a large energy density, while low manufacturing effort may be required (e.g., cutting and waste may be avoided). Alternatively, another geometry of the wafer or the battery may be desired. For example, the wafer may be cut to a quadratic or rectangular shape with still more than half of the original wafer size. In the following, the term wafer may mean at least more than half of a wafer or a complete wafer.

The wafer 110 may represent a battery element or battery cell of the battery 100. The wafer 110 can provide an electrical voltage at the wafer electrode due to the solid state battery structures implemented on the wafer 110. In other words, a battery element may be part of a battery and may be able to provide a voltage (stored energy) at electrodes. The battery 100 may at least further comprise a package protecting the battery element. Optionally, the battery 100 may comprise more than one battery element (e.g., wafers with solid state battery structures in trenches). In other words, the battery 100 may optionally comprise a plurality of at least more than half wafers with trenches comprising solid state battery structures.

The two wafer electrodes 112 (e.g., anode and cathode) may provide the energy stored by the battery structures 116 of the wafer 110 and may be connected to the two externally accessible battery electrodes 102, to the wafer electrodes of other wafers or battery elements of the battery or to a control circuit of the battery (e.g., for controlling a supply voltage or supply current provided by the battery).

A control circuit (e.g., for controlling a supply voltage or supply current provided by the battery or determining a remaining charge or a charge status) may be integrated on the wafer 110 or may be arranged between the two wafer electrodes 112 and the two externally accessible battery electrodes 102 (e.g., on a separate semiconductor die). Optionally, the control circuit may provide a signal (e.g., indicating a remaining charge of the battery) to an optional further externally accessible battery electrode of the battery 100 or may receive a control signal (e.g., triggering a control of a supply voltage or supply current provided by the battery) from an optional further externally accessible battery electrode of the battery 100.

The wafer 110 may be a semiconductor wafer (e.g., silicon based wafer, silicon carbide based wafer, gallium arsenide based wafer), a glass wafer or another wafer suitable for forming trenches 114 with solid state battery structures.

The wafer 110 comprises a plurality of trenches 114 etched into the substrate. The trenches may be etched into the wafer 110 starting from a surface of the wafer 110 until a desired depth is reached.

For example, some or all trenches 114 of the plurality of trenches 114 may reach deeper into the wafer 100 than 500 μm (or deeper than 700 μm or deeper than 800 μm) or may reach through the whole wafer 100 (e.g., wafer with thickness of 750 μm for a diameter of 200 mm or 880 μm for a diameter of 300 mm).

For example, some or all trenches 114 of the plurality of trenches 114 may comprise a maximal depth larger than a maximal lateral dimension. For example, some or all trenches 114 of the plurality of trenches 114 may comprise an aspect ratio larger than 10 (or larger than 20 or larger than 30). By increasing the aspect ratio, the surface for forming solid state battery structures may be increased resulting in a higher energy density.

Optionally, some or all trenches 114 of the plurality of trenches 114 may comprise a maximal width of less than 300 μm (or less than 200 μm or between 5 μm and 200 μm, for example, 40 μm). The maximal width may be a maximal lateral extension of the trench 114 at the surface of the wafer 100, for example. By implementing narrow trenches 114, a number of trenches manufacturable on the wafer 100 may be increased.

For example, some or all (except at the edge) trenches of the plurality of trenches may comprise a distance to each other (a distance to neighboring trenches or to the closest neighboring trench) between 2 μm and 300 nm (or between 1 μm and 500 nm). By implementing trenches with small distance to each other, a number of trenches manufacturable on the wafer may be increased. Keeping the distance between trenches above a predefined limit may increase the stability of the wafer 100.

At least a part of a trench 114, of some trenches or all trenches of the plurality of trenches 114 is filled with a solid state battery structure 116. The solid state battery structure 116 within the trench 114, some trenches or all trenches of the plurality of trenches 114 comprises electrodes or electrode layers electrically connected to the wafer electrodes 112. A solid state battery structure 116 may be a battery structure within one trench or may extend over several trenches of the plurality of trenches 114 or all trenches 114 of the plurality of trenches 114. Optionally, a solid state battery structure may be implemented in several or each trench and the electrodes of the solid state battery structures 116 may be connected or coupled to each other. A solid state battery structure 116 extending over several trenches may be obtained by simultaneously forming solid state battery structures 116 within these trenches.

The solid state battery structure 114 within the trench or within several or all trenches may comprise a solid state electrolyte layer between a first electrode layer connected to a first wafer electrode of the two wafer electrodes and a second electrode layer connected to a second wafer electrode of the two wafer electrodes, for example. In other words, an anode layer of the solid state battery structure 114 may be connected or coupled to (e.g., through a control circuit or other solid state battery structures) an anode electrode of the wafer 110 and a cathode layer of the solid state battery structure 114 may be connected or coupled to a cathode electrode of the wafer 110.

For example, the solid state electrolyte layer may comprise or may consist of lithium phosphorus oxynitride LiPON or another solid state electrolyte.

Alternatively or additionally, the electrolyte layer may comprise or may consist of at least one material of the following group of materials, the group including: lithium, phosphorus, lanthanum, titanium, lithium phosphorus oxynitride, lithium lanthanum titanium oxide (LLTO), a polymer, poly oxyethylene, $LiPO_{1-x}N_{1-y}$, thio-LISICON materials (lithium superionic conductor, e.g., $Li_{10}GeP_2S_{12}$ or $Li_xGe_yP_zS_4$), $Li_xM_{1-y}M'_yS_4$ (M=Si or Ge, and M'=P, Al, Zn, Ga, or Sb), $Li_xAl_yTi_z(PO_4)$, Silicon Oxide ($SiO_2$), Silicon Nitride $Si_3N_4$ or any other suitable electrolyte, e.g., sodium super ion conductors (NASICON), NASICON type materials (e.g., $Na_{1+x+4y}M_{2-y}Si_xP_{3-x}O_{12}$, 0≤x≤3, 0≤y≤1 (M=Ti, Hf, or Zr)), $Li_2S$ $P_2S_5$, $Li_2S$ $P_2S_5$ $SiS_2$, $Li_2S$ $SiS_2$, or oxysulfide glass (e.g., $[[Li_2S]_{0.6}[SiS_2]_{0.4}]_{1-x}[Li_xMO_y]_x$ (M=Si, P, Ge, B, Al, Ga, In)). A solid state electrolyte may be regarded as a material which may transport electrical charge due to the movement of ions in the material, e.g., through channels, voids, or empty crystallographic positions in their crystal structure.

Optionally, the first electrode layer may comprise an anode layer (e.g., comprising or consisting of carbon or silicon) and optionally a collector layer (e.g., comprising or consisting of titan nitride TiN). The collector layer may be also arranged within the trench or may cover one or more trenches being in contact with the anode layer at the surface of the wafer, for example.

Alternatively or additionally, the anode layer may comprise silicon, polysilicon, amorphous silicon, carbon, amorphous carbon, graphite, $Li_4Ti_5O_{12}$ (LTO), $CuN_3$, titanium oxide ($TiO_2$), or any other suitable anode material, as for example titanium, a metal silicide (e.g., calcium silicide, magnesium silicide, molybdenum silicide), $Li_{15}Si_4$, a lithium containing alloy (e.g., $Li_{22}M_5/M$ (M=Ge, Sn, Pb, Si)), $Li_{4.4}Si$, $Li_{4.4}Ge$, tin-oxide based glasses (e.g., SnO—$B_2O_3$—$P_2O_5$—$Al_2O_3$), SnS—$P_2S_5$, $Li_2S$—$P_2S_5$, silicon containing transition metal nitrides (e.g., SiMxNy (M=Co, Ni, Cu)), Ni coated by $TiO_2$, Sn, Ge, Al, Pb, In, ZnO. The anode may be defined herein, for example, as the negative electrode during charge of the battery. According to various embodiments, the anode may include a mixture of anode materials (as described before) or a mixture of an anode material with another additional material to provide a microcomposite material as anode material.

Further, the second electrode layer may comprise a cathode layer (e.g., comprising or consisting of lithium cobalt oxide $LiCoO_2$) and optionally a collector layer (e.g., comprising or consisting of titan nitride).

Alternatively or additionally, the cathode layer may comprise lithium, cobalt, nickel, aluminum, oxygen, iron, phosphorous, sulfur, manganese, vanadium, manganese spinel, lithium nickel manganese cobalt, lithium iron phosphate (doped or undoped), transition metal oxides (e.g., $MnO_2$, $Fe_3O_4$, $Co_3O_4$, $TiO_2$, NiO), olivine (e.g., $LiCoPO_4$), $LiCoO_2$, $LiNiO_2$, $LiNi_xMn_yO_2$, $LiNi_{1-x}Co_xO_2$, $LiNi_{0.85}Co_{0.1}Al_{0.05}O_2$, $LiNi_{0.33}Co_{0.33}Mn_{0.33}O_2$, $LiMn_2O_4$ (spinel structure), $Li_{4/3}Ti_{5/3}O_4$, $V_2O_5$, amorphous $V_2O_5$, $LiMn_2O_4$, $Li_2S$, and $LiFePO_4$, or any other suitable cathode material, e.g., including nickel or stainless steel. The cathode may be defined herein, for example, as the positive electrode during charge of the battery.

Alternatively or additionally, one or both collector layers may comprise Cu, TiN, Pt, Al, AlCu, W, Au, WN, Carbon or compositions or alloys of these materials.

In some embodiments, a trench, some trenches or all trenches of the plurality of trenches comprise a cavity. In other words, the solid state battery structure may be formed on the walls of one, some or all trenches leaving an air gap in the middle of the trenches. Afterwards, the air gap may be covered by another layer (e.g., metal layer for implementing an electrode of the wafer or the anode layer mentioned above) leaving a cavity within one, some or all trenches of the plurality of trenches.

A cavity within a trench may provide space for an expansion of the solid state battery structure during charging and/or discharging. Therefore, mechanical stress within the at least more than half of a wafer 110 due to the expansion process may be significantly reduced by implementing cavities within the trenches.

A cavity may be formed or kept within all trenches comprising a solid state battery structure. In this way, the mechanical stress may be kept very low. Alternatively, it may be sufficient to form or keep a cavity in every second or third (or another number) trench in order to reduce the mechanical stress to a desired level.

Figure 2:
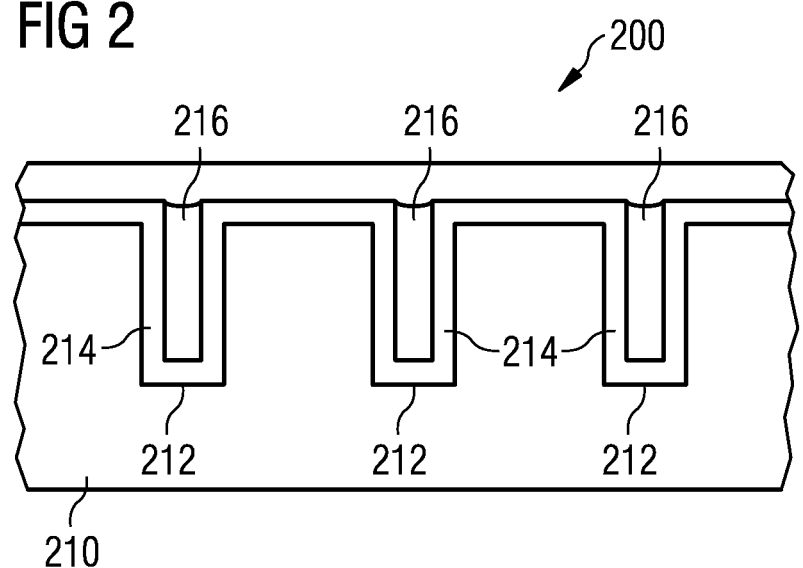
FIG. 2 shows a schematic cross section of a battery element with cavities.

FIG. 2 shows a schematic cross section of a battery element 200 according to an embodiment. The battery element 200 (or battery cell) comprises a substrate 210 with a plurality of trenches 212 reaching into the substrate 210. A part of a trench 212 (or some or all trenches) of the plurality of trenches 212 is filled with a solid state battery structure 214. Further, the trench 212 (or some or all trenches) of the plurality of trenches 212 comprises a cavity 216.

A cavity 216 within a trench may provide space for an expansion of the solid state battery structure during charging and/or discharging as mentioned above.

The substrate 210 may be a small die, a large part of a wafer or a complete wafer, for example. The substrate 210 may be a semiconductor substrate (e.g., silicon based, silicon carbide based, gallium arsenide based), a glass substrate or another substrate suitable for forming trenches 114 with solid state battery structures.

Optionally, a part of each trench of the plurality of trenches is filled with a solid state battery structure and optionally each trench of the plurality of trenches comprises a cavity.

The battery element 200 may comprise one or more optional additional features corresponding to one or more aspects described in connection with the proposed concept or one or more embodiments (e.g., FIG. 1) described above (e.g., dimension of trenches, solid state battery structure, electrodes, package).

Figure 3:
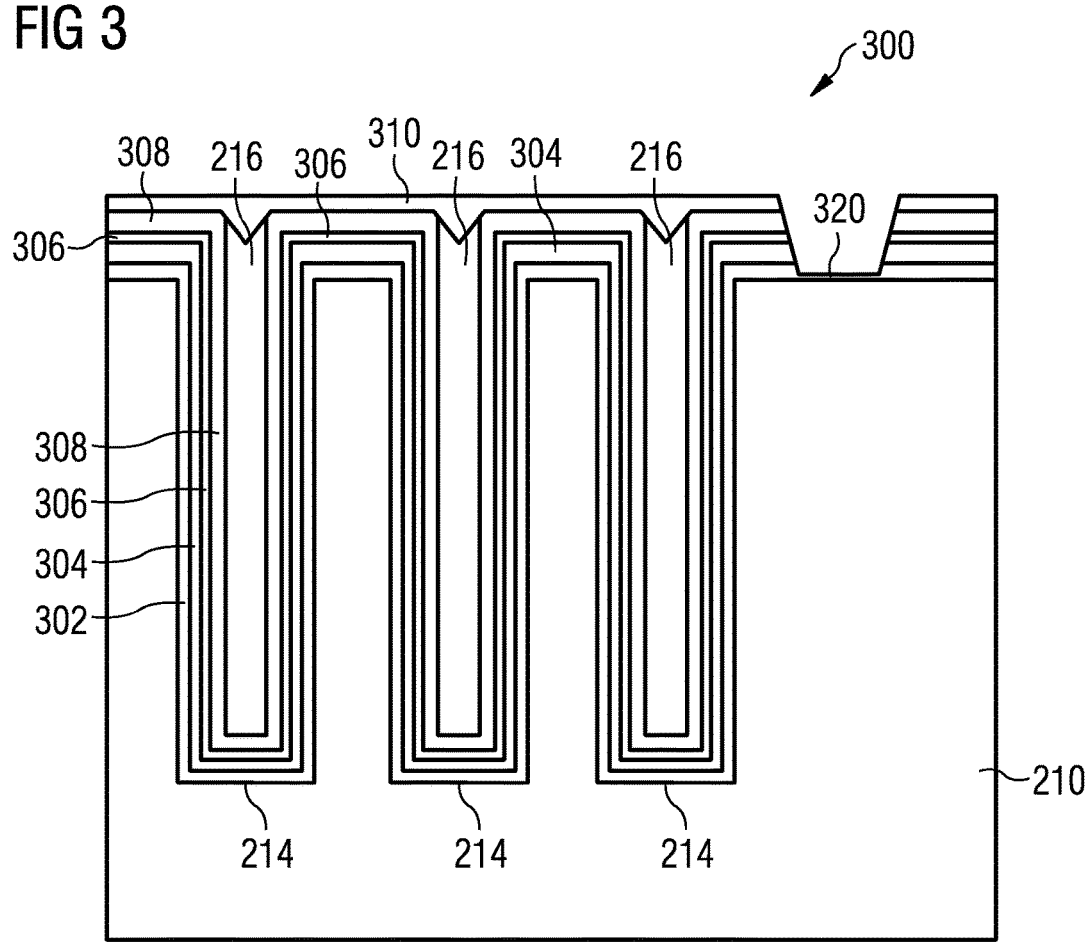
FIG. 3 shows a schematic cross section of another battery element with cavities.

FIG. 3 shows a schematic cross section of a battery element 300 according to an embodiment. The implementation of the battery element 300 is similar to the battery element shown in FIG. 2. The solid state battery structure within the trenches 214 (e.g., trench cells) comprises a solid state electrolyte layer 306 between a first electrode layer and a second electrode layer. The solid state electrolyte layer 306 may comprise or may consist of lithium phosphorus oxynitride LiPON. Further, the first electrode layer may comprise an anode layer 308 (−) (e.g., comprising or consisting of carbon or silicon). A current collector layer 310 (−) (e.g., comprising or consisting of titan nitride TiN) may extend over several or all trenches. The current collector layer 310 may cover the openings of the trenches and may seal the cavity 216 remaining within the trenches 214. Further, the second electrode layer may comprise a cathode layer 304 (+) (e.g., comprising or consisting of lithium cobalt oxide LiCoO2) and a current collector layer 302 (+) (e.g., comprising or consisting of titan nitride). The current collector layer 310 of the first electrode layer may be connected or coupled to an anode battery element electrode (e.g., anode wafer electrode) and the current collector layer 302 of the second electrode layer may be connected or coupled to a cathode battery element electrode (e.g., cathode wafer electrode).

The first electrode layer and the second electrode layer may be electrically connectable at the same side of the substrate. For example, the other layers of the solid state battery structure may be removed at a contact area 320 for providing access to the second electrode layer. Alternatively, the first electrode layer and the second electrode layer may be connectable at different sides of the substrate (e.g., FIGS. 5 and 6).

The battery element or structure may be manufacturable or manufactured with semiconductor processes mainly or only, for example. Some new materials may be used (e.g., deposited) in connection with the semiconductor processes.

The battery element 300 may comprise one or more optional additional features corresponding to one or more aspects described in connection with the proposed concept or one or more embodiments (e.g., FIG. 1 or 2) described above (e.g., dimension of trenches, solid state battery structure, electrodes, package, cavity).

Some embodiments relate to a mobile device comprising a casing accommodating an electronic device configured to provide at least one of audio data and video data for a user and a battery configured to provide a power supply for the electronic device. The battery comprises a battery element comprising a substrate with a plurality of trenches reaching into the substrate. A part of a trench of the plurality of trenches is filled with a solid state battery structure. The substrate comprises maximal dimension larger than a maximal dimension of the casing of the mobile device.

Due to the usage of large substrates, the battery size can be adapted to the size of the mobile device. In this way, an efficient power supply for mobile devices may be provided.

A mobile device may be a smart phone, a laptop or a tablet, for example.

A maximal dimension of a casing of may be an extension of the casing in a direction of a largest dimension of the casing. For example, for a substantially rectangular casing, the maximal dimension may be the diagonal of the rectangle. In other words, the substrate may comprise a geometry having a maximal dimension (e.g., diagonal of a rectangle) being larger than at least half (or at least 70% or at least 80%) of a maximal dimension of the casing of the mobile device.

More details or aspects regarding the battery, the battery element, the substrate, the trenches and/or the solid state battery structure are mentioned in connection with the proposed concept or one or more embodiments described above.

Figure 4:
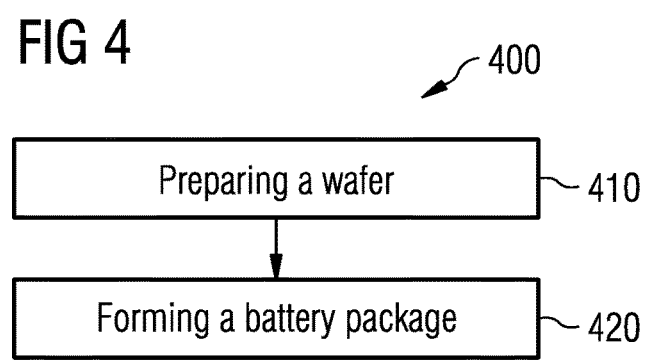
FIG. 4 shows a flow chart of a method for forming a battery.

FIG. 4 shows a flow chart of a method 400 for forming a battery according to an embodiment. The method 400 comprises preparing 410 a wafer comprising (at least) two wafer electrodes. The wafer comprises a plurality of trenches reaching from a surface of the wafer into the wafer. At least a part of a trench of the plurality of trenches is filled with a solid state battery structure. Further, the solid state battery structures within the trenches comprise electrodes electrically connected to the wafer electrodes. Additionally, the method 400 comprises forming 420 a battery package comprising two externally accessible battery electrodes to provide a supply voltage to a connectable device.

By using a wafer (e.g., substantially the complete wafer) directly for forming a battery, high energy densities may be reached with low cost, since a wafer can be handled in one piece during manufacturing. Further, no or only few space of the wafer may be lost for areas used for cutting the wafer. Further, the manufacturing time and costs for cutting the wafer can be kept low or may be completely avoided.

Preparing 410 the wafer may comprise forming trenches, solid state battery structures and wafer electrodes on the wafer and/or may comprise preparing (e.g., cleaning, positioning) the wafer for forming 420 the battery package.

For example, the complete wafer may be used for the battery and may be implemented in the battery package. Alternatively, the method 400 may comprise cutting the wafer to obtain a remaining part of the wafer with a desired geometry. The remaining part of the wafer may be at least more than half of the wafer and may comprise the two wafer electrodes. In this way, a battery with a desired geometry and/or size may be provided.

The method 400 may comprise one or more optional additional acts corresponding to one or more aspects described in connection with the proposed concept or one or more embodiments (e.g., FIG. 1-3) described above (e.g., dimension of trenches, solid state battery structure, electrodes, package, cavity).

Some embodiments relate to a wafer battery. Such wafer batteries may be integrated or implemented in battery packs comprising battery cells (e.g., wafer batteries), wiring and assembly parts and at least one battery management system BMS, for example.

A wafer battery or battery comprising battery structures implemented on wafers may replace pouch cells for several reasons. Wafers with diameters of 100 mm, 150 mm, 200 mm, 300 mm or 450 mm or larger may be used. Semiconductor tools and process may be used, for example, to pattern the surface. Real 3D battery design may become possible. For example, energy density and power density can be influenced by pattern feature sizes. Higher energy density than with a pouch cell may be achievable. Also higher power density than pouch cells, depending on material choice and pattern feature sizes, may be achievable, for example. Trenches with ~AR 30 (aspect ratio of 30) or higher may provide higher power density than pouch cells, for example. Existing (manufacturing) tools may be used, e.g., etching 300 mm tools. Assuming same energy content, the weight of the battery may be reduced by factor of at least 2, for example.

For example, ready processed wafer=system (e.g., combing carrier function and active battery parts) may be obtained. Because of 3D design both, high specific energy densities and specific power densities may be achieved.

A proposed (solid state) battery may be used as traction battery for EV (electric vehicle, car) or storage device for energy (e.g., renewable energies, for example, solar energy), for example.

The proposed concept may be enabled by the capability of forming deep trenches (e.g., on 300 mm wafers), for example.

By using the proposed concept, a micro battery may be integrated into an ASIC (Application Specific Integrated Circuit). Solid state batteries may be stacked for cars and/or energy storage applications. For example, an electric vehicle may comprise same or similar weight with more range (e.g., more than two times, three times or four times higher).

Semiconductor processes may be used for fabrication. New materials may be introduced into the process chain (e.g., LiPON, $LiCo_xO_y$), for example.

A proposed battery may be a (smart) battery comprising an embedded controller (e.g., control circuit mentioned above).

The surface of the wafer may be enlarged through trench usage. Further, the semiconductor pattering may allow a flexible wiring. In this way, faster load cycles may be achievable.

The energy density on battery block level may be compared between different used materials. For example, a wafer battery based on LiCoO2 (lithium cobalt oxide) and carbon may comprise a weight of approximately 80 kg (e.g., whole system with cells, assembly and cooling) for 16 KWh (or ~44 kg for active cells) resulting in a specific energy density of approximately 190 Wh/kg. For example, a wafer battery based on LiS (lithium sulfur) and Si (silicon) may comprise a weight of approximately 45 kg (e.g., whole system with cells, assembly and cooling) for 16 KWh (or ~17 kg for active cells) resulting in a specific energy density of approximately 360 Wh/kg. A weight reduction of more than 75% may be achievable.

Further, the power density (e.g., power delivered by the engine, W/kg) may be increased by implementing the proposed concept.

Figure 5:
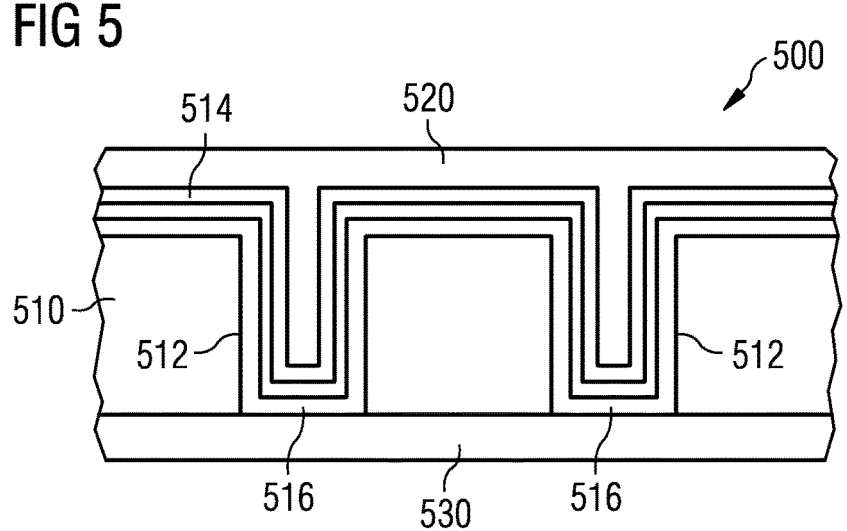
FIG. 5 shows a schematic cross section of a battery element with backside electrode.

FIG. 5 shows a schematic cross section of a battery element 500 according to an embodiment. The battery element 500 (or battery cell) comprises a substrate 510 with a plurality of trenches 512 reaching from a surface of the substrate 510 into the substrate 510. At least a part of each trench 512 of the plurality of trenches 512 is filled with a solid state battery structure. Further, the battery element 500 comprises a front side battery element electrode 520 arranged at a front side of the substrate 510 and electrically connected or connectable to a first electrode layer 514 of the solid state battery structures within the plurality of trenches 512. Additionally, the battery element 500 comprises a backside battery element electrode 530 arranged at a backside of the substrate 510 and electrically connected or connectable to a second electrode layer 516 of the solid state battery structures within the plurality of trenches 512.

A battery element with electrodes (anode and cathode) at opposite sides of a substrate may be integrated in a battery with low effort, since the electrodes are easily accessible at both sides of the battery element. Further, several battery elements with front side and backside electrode may be stacked with low effort. Therefore, a battery with high energy density may be obtainable.

The battery element 500 or battery cell may be used for forming a battery. The battery element 500 can provide an electrical voltage at the front side battery element electrode 520 and the backside battery element electrode 530 due to the one or more solid state battery structures implemented on the substrate 510. In other words, a battery element 500 may integrated in a battery and is able to provide stored energy at electrodes. For example, a battery may at least comprise a package protecting at least one battery element 500. Optionally, a battery may comprise more than one battery element (e.g., substrate with solid state battery structures in trenches).

The substrate 510 may be a small die, a large part of a wafer or a complete wafer, for example. The substrate 510 may be a semiconductor substrate (e.g., silicon based, silicon carbide based, gallium arsenide based), a glass substrate or another substrate suitable for forming trenches 512 with solid state battery structures.

The front side of the substrate 510 may be the side of the substrate 510 used for starting etching the trenches 512 into the substrate 510 and/or the side of the substrate 510 used for depositing the solid state battery structure, for example. The backside of the substrate 510 may be the side of the substrate 510 located opposite to the front side.

The front side battery element electrode 520 may be a contact area, contact structure or contact layer accessible at the front side of the substrate 510. In other words, the front side battery element electrode 520 may enable an electrical connection or may implement an interface to another device, a battery electrode or another battery element at the front side of the substrate 510. For example, the front side battery element electrode 520 may be a contact layer extending along at least a half of the front side (or at least 70%, at least 80% or at least 90%) of the substrate 510.

The backside battery element electrode 530 may be a contact area, contact structure or contact layer accessible at the backside of the substrate 510. In other words, the backside battery element electrode 530 may enable an electrical connection or may implement an interface to another device, a battery electrode or another battery element at the backside of the substrate 510. For example, the backside battery element electrode 530 may be a contact layer extending along at least a half of the backside (or at least 70%, at least 80% or at least 90%) of the substrate 510.

The front side battery element electrode 520 and/or the backside battery element electrode 530 may comprise or consist of copper, aluminum, gold or another material (e.g., alloy) suitable for providing a reliable contact interface.

For example, the trenches 512 of the plurality of trenches 512 reach from the front side of the substrate to the backside of the substrate. In other words, the trenches 512 may reach through the whole substrate 510. In this way, the second electrode layer of the solid state battery structures within the plurality of trenches can be electrically connected to the backside battery element electrode 530 with low effort, for example. Alternatively, a through silicon via may be etched from the backside of the substrate 510 to the second electrode layer of the solid state battery structures within the plurality of trenches to enable an electrical contact at the backside, for example.

More details and optional aspects of the battery element 500 are described in connection with the proposed concept or one or more embodiments (e.g., FIG. 1-4) described above (e.g., substrate, dimension of trenches, solid state battery structure, electrodes, package).

For example, the solid state battery structures within the trenches 512 may comprise a solid state electrolyte layer between the first electrode layer 514 and the second electrode layer 516. The solid state electrolyte layer may comprise lithium phosphorus oxynitride. The first electrode layer 514 may comprise an anode layer comprising carbon or silicon. The second electrode layer 516 may comprise a cathode layer comprising lithium cobalt oxide and a collector layer comprising titan nitride.

For example, the substrate 510 may comprise a thickness of more than 500 μm. The trenches of the plurality of trenches 512 may comprise an aspect ratio larger than 10. The trenches of the plurality of trenches may comprise a maximal width of less than 300 μm. The trenches of the plurality of trenches may comprise a distance to each other between 2 μm and 300 nm. The trenches of the plurality of trenches may comprise a maximal depth larger than a maximal lateral dimension. Optionally, the substrate is substantially a complete wafer.

Figure 6:
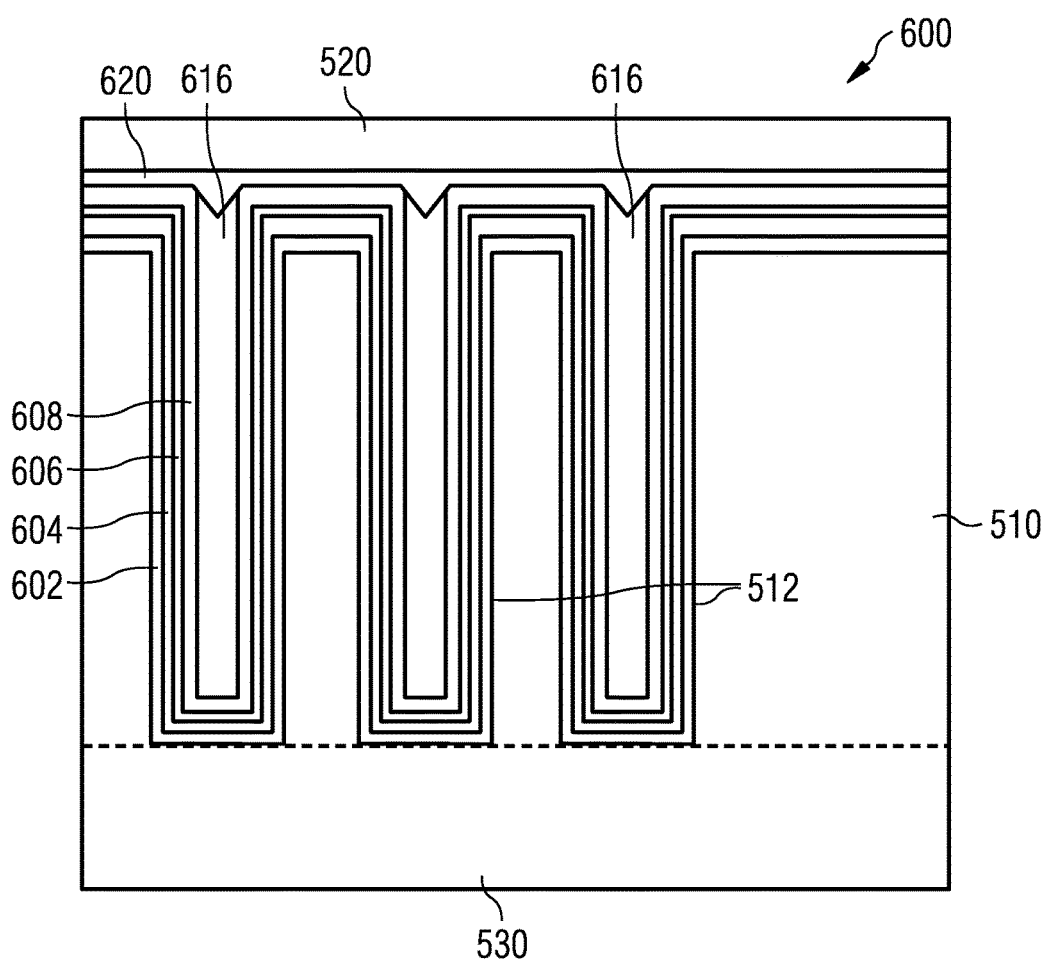
FIG. 6 shows a schematic cross section of another battery element with backside electrode.

FIG. 6 shows a schematic cross section of a battery element 600 according to an embodiment. The implementation of the battery element 600 is similar to the battery element shown in FIG. 5. The solid state battery structure within the trenches 512 (e.g., trench cells) comprises a solid state electrolyte layer 606 between the first electrode layer and the second electrode layer. The solid state electrolyte layer 606 may comprise or may consist of lithium phosphorus oxynitride LiPON. Further, the first electrode layer may comprise an anode layer 608 (−) (e.g., comprising or consisting of carbon or silicon). A current collector layer 620 (−) (e.g., comprising or consisting of titan nitride TiN) may extend over several or all trenches. The current collector layer 620 may cover the openings of the trenches and may seal the cavity 616 remaining within the trenches 214. Further, the second electrode layer may comprise a cathode layer 604 (+) (e.g., comprising or consisting of lithium cobalt oxide $LiCoO_2$) and a current collector layer 602 (+) (e.g., comprising or consisting of titan nitride). The first electrode layer of the solid state battery structure is at least partly covered by the front side battery element electrode 520 (e.g., comprising or consist of copper). Further, parts of the second electrode layer of the solid state battery structure located at the bottom of the trenches 512 are at least partly covered by the backside battery element electrode 530 (e.g., comprising or consist of copper).

The current collector layer 620 of the first electrode layer may be in contact, connected or coupled to an anode battery element electrode (e.g., anode electrode) through the front side battery element electrode 520 and the current collector layer 602 of the second electrode layer may be in contact, connected or coupled to a cathode battery element electrode (e.g., cathode electrode) through the backside battery element electrode 530.

The battery element 600 may comprise one or more optional additional features corresponding to one or more aspects described in connection with the proposed concept or one or more embodiments (e.g., FIG. 1-5) described above (e.g., dimension of trenches, solid state battery structure, electrodes, package, cavity).

Figure 7:
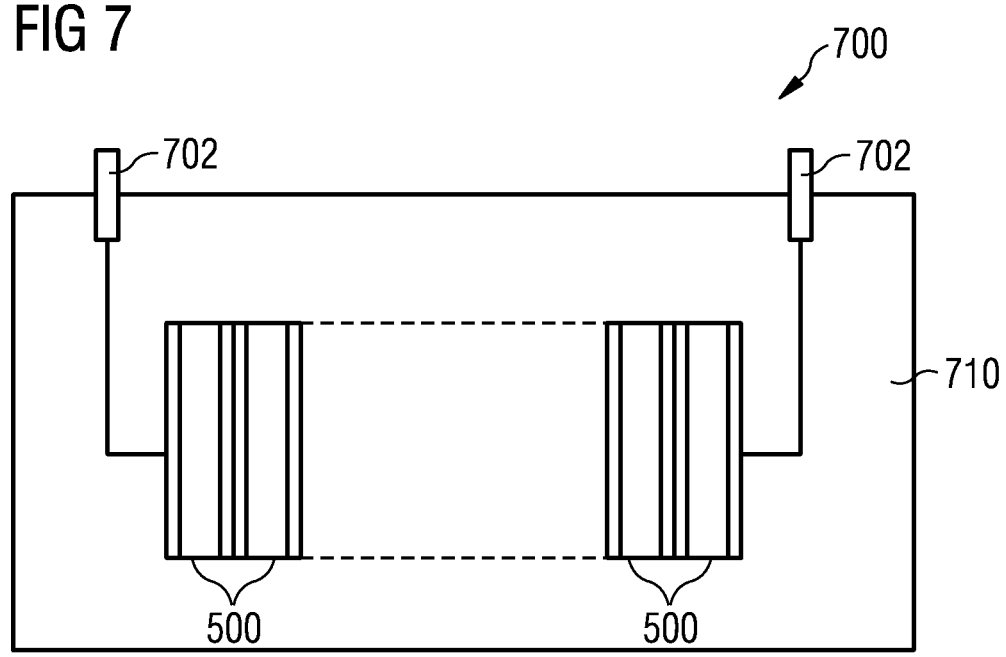
FIG. 7 shows a schematic cross section of a battery with a battery element stack.

FIG. 7 shows a schematic cross section of a battery 700 according to an embodiment. The battery 700 comprises a plurality of battery elements according the proposed concept or one or more embodiments (e.g., FIG. 1-6) described above arranged in a stacked manner.

By stacking a plurality of proposed battery elements, a battery providing a desired voltage or desired capacity may be feasible. The battery elements may be stacked with low effort, due to the electrodes arranged on opposite sides of the substrate. In this way, a battery with high power density may be obtained.

The battery 700 may comprise one or more stacks of battery elements 500. The one or more stacks may be encapsulated by a battery package 710. Further, the one or more stacks may be connected or connectable to externally accessible battery electrodes 702.

FIG. 8 shows schematic illustrations of possible battery element stacks. For example, a battery element 800 may comprise a structured wafer (e.g., structured by trenches comprising solid state battery structures) and a front side electrode (e.g., +) and a backside electrode (e.g., −) providing 4V and 30 Ah.

In an example, four such battery elements 800 may be stacked so that front side electrodes are in contact with backside electrodes resulting in a stack providing 16V and 30 Ah between a positive + electrode 812 and a negative − electrode 814 of the stack.

Alternatively, four such battery elements 800 may be stacked so that front side electrodes are in contact with front side electrodes and backside side electrodes are in contact with backside electrodes resulting in a stack providing 4V and 120 Ah between a positive electrode 824 and a negative electrode 822 of the stack.

For example, a battery pack for an electric vehicle with a supply voltage of 360-380V may be implemented by stacking proposed battery elements.

FIG. 9 shows a flow chart of a method 900 for forming a battery according to an embodiment. The method 900 comprises etching 910 trenches into a substrate and forming 920 a solid state battery structure within the trenches. Further, the method 900 comprises forming 930 a front side battery element electrode arranged at a front side of the substrate and electrically connected or connectable to a first electrode layer of the solid state battery structure within the trenches. Additionally, the method 900 comprises forming 940 a backside battery element electrode arranged at a backside of the substrate and electrically connected or connectable to a second electrode layer of the solid state battery structure within the trenches.

A battery element with electrodes (anode and cathode) at opposite sides of a substrate may be formed with low effort, since the electrodes are easily accessible at both sides of the battery element.

For example, a wafer (substrate) may be the carrier for the structures. One electrode on one surface may be forming a comb structure into the wafer, the other electrode on the backside may be forming a complementary comb structure on the other side. In between, the battery layers may be located.

Optionally, the method 900 may comprises depositing an auxiliary layer at the backside of the substrate before etching the trenches. Then the trenches may be etched through the substrate until the auxiliary layer is reached. The auxiliary layer may be removed after forming the solid state battery structure within the trenches to uncover the second electrode layer at the backside of the substrate. The auxiliary layer may provide an etch stop for the trench etch and/or may increase the mechanical stability during manufacturing.

FIG. 10a-c shows an example for forming or processing a battery or battery element with an auxiliary layer at the backside. FIG. 10a shows a deposition of an auxiliary layer 1020 (e.g., stop layer comprising or consist of silicon nitride) on the backside of the substrate 510 (e.g., wafer). In this way, a stop layer for a silicon Si etch may be provided. Afterwards, a battery formation (forming of solid state battery structure) may be performed (at a front side) on the substrate 510 as shown in FIG. 10b (see also FIG. 5-6). Then, the auxiliary layer 1020 (e.g., nitride) is removed on the backside and a front side/backside (metal) electrode 520, 530 is formed as shown in FIG. 10c.

In other words, a proposed structure may be formed by a substrate (e.g., like a silicon wafer), a nitride deposition on the backside of substrate, a battery formation (e.g., etching trenches in silicon, deposition of bottom electrode layer, deposition of battery layers like solid electrolyte etc., deposition of top electrode layer), removing backside nitride and deposition of metal electrode on front side and backside, for example.

Alternatively, the method 900 may comprise thinning the substrate from the backside of the substrate after forming the solid state battery structure within the trenches until the second electrode layer is uncovered at the backside of the substrate.

FIG. 10a-c shows an example for forming or processing a battery or battery element by thinning the substrate from the backside. FIG. 11a shows a substrate 510 (e.g., wafer). A battery formation (forming of solid state battery structure) may be formed (at a front side) on the substrate 510 as shown in FIG. 11b (see also FIG. 5-6). Then, a backside polish (e.g., thinning film technology) to the bottom electrode (of the solid state battery structure) may be performed and a front side/backside (metal) electrode 520, 530 is formed as shown in FIG. 11c.

In other words, a proposed structure may be formed by a substrate (e.g., like a silicon wafer), battery formation (e.g., etching trenches in silicon, deposition of bottom electrode layer, deposition of battery layers like solid electrolyte etc., deposition of top electrode layer), wafer thinning until stop on bottom electrode and deposition of metal electrode on front side and backside, for example.

Each wafer may comprises a top electrode on the one wafer surface, which can be chosen in thickness independently of the layers in the electrolyte, and a bottom electrode, which can also be chosen independently, and both can be chosen independently in thickness of the layers in the trenches required for the battery, for example.

Optionally, the method 900 may comprise stacking a plurality of battery elements so that the electrodes of neighboring battery elements are in contact with each other.

The batteries or battery elements comprising wafer may be easily stacked either to form a battery with higher voltage (+/−, +/−, +/−, etc.) or to form batteries with higher capacity (+/−, −/+, +/−, −/+, etc.) or both (e.g., FIG. 7-8).

The method 900 may comprise one or more optional additional acts corresponding to one or more aspects described in connection with the proposed concept or one or more embodiments (e.g., FIG. 1-8) described above (e.g., dimension of trenches, solid state battery structure, electrodes, package, cavity).

Some embodiments relate to a battery pack. A proposed battery design may enable to get the current out over a low ohmic path. This may be important for Power density, e.g., to get small charging times and to get high peak power out of the battery. In the proposed setup mentioned above, two contacts are made on the front side to contact the two electrode layers, for example. The thickness of the bottom layer may be limiting the current by its series resistance.

According to a proposed aspect, wafer backside processing may be used to contact the bottom electrode from the backside (3-D structure). This may enable very low ohmic paths to the solid state electrolyte. In addition, the electrode on the surface can be made thicker than in the trenches, which may help to increase the conductivity further for more power density. As the wafers may have one electrode on the one surface and one on the other, it is easy to stack the wafers to form either higher current capability or to form batteries with higher voltage, for example.

According to a proposed aspect, a battery may be formed with a wafer, where the front side of the wafer is one electrode and the backside is the other electrode. The process for forming such a battery may use either a stop layer during Si etch or a backside thinning process with stop on the bottom electrode. The combination of many of these Batteries (battery elements) to one Battery Package with higher current or higher voltage may be possible, for example.

Figure 12:
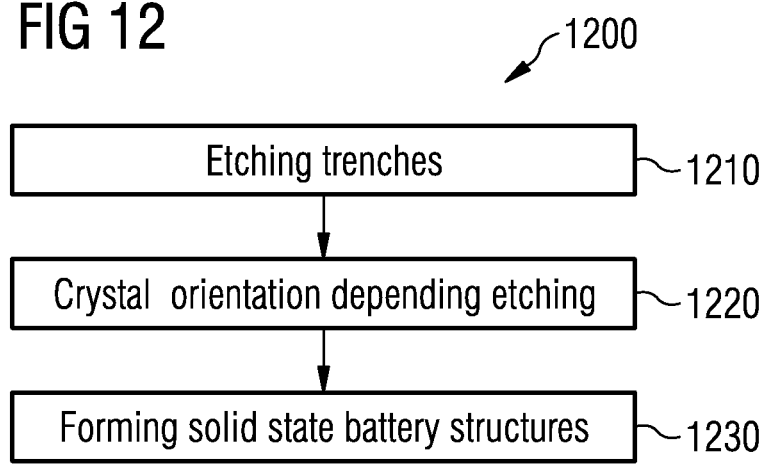
FIG. 12 shows a flow chart of a method for forming a battery element.

FIG. 12 shows a flow chart of a method 1200 for forming a battery element according to an embodiment. The method 1200 comprises etching 1210 trenches into a substrate and crystal orientation dependent etching 1220 of the trenches. Further, the method 120 comprises forming 1230 solid state battery structures within the trenches.

By using crystal orientation dependent etching, angular geometries of the trenches may be manufacturable or can be manufactured. Trenches with angular geometries may enable a very dense distribution or packing of the trenches. In this way, the power density of the battery element and a battery using such battery elements may be increased.

For example, a dry chemical etch process is used for the etching 1210 of the trenches into the substrate. The etching 1210 of the trenches may comprise a substantially isotropic etching behavior. A mask may be used to etch trenches at desired positions. By using a dry chemical etch process trenches with a high aspect ratio may be obtainable.

For example, a wet chemical etch process may be used for the crystal orientation dependent etching 1220. The crystal orientation dependent etching 1220 may comprise a substantially anisotropic etching behavior. In other words, the crystal orientation dependent etching 1220 may comprise preferred etch directions along crystallographic directions of the substrate. Optionally, Potassium hydroxide KOH or ammonium hydroxide $NH_4OH$ may be used for the crystal orientation dependent etching (e.g., for a silicon substrate) or another liquid suitable for crystal orientation dependent etching of the material of the substrate.

The etching 1210 of the trenches may set a basic or general distribution of the trenches over the substrate. For example, the trenches may be distributed over the substrate according to a hexagonal pattern or a quadratic pattern. In other words, centers of the geometry of the trenches may be arranged on the grid points of a hexagonal or a quadratic grid, for example.

The crystal orientation dependent etching 1220 may adapt a geometry of the trenches caused by the previous etching (e.g., dry chemical) to a desired geometry. For example, the trenches may comprise a substantially rectangular lateral shape or quadratic lateral shape after the crystal orientation dependent etching 1220. In other words, a top view of a trench after crystal orientation dependent etching 1220 may comprise substantially rectangular shape or quadratic shape.

For example, a deviation from the rectangular shape or quadratic shape may be less than 10% (or less than 5% or less than 1%) of a lateral length or side length of the rectangular shape or quadratic shape.

For example, a very dense distribution may be used for the etching 1210 of the trenches and the area wasted between the trenches may be further reduced by adapting the geometry of the trenches from a basically rounded geometry after etching 1210 the trenches to a basically angular geometry after the crystal orientation dependent etching 1220.

Figure 13C:
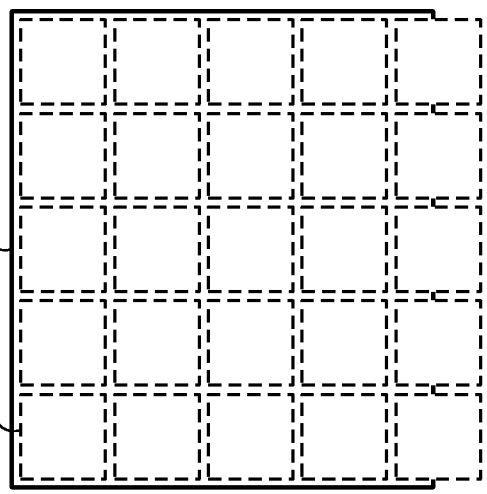
FIG. 13*a*-13*c* show schematic top views during forming a battery element.
Figure 13B:
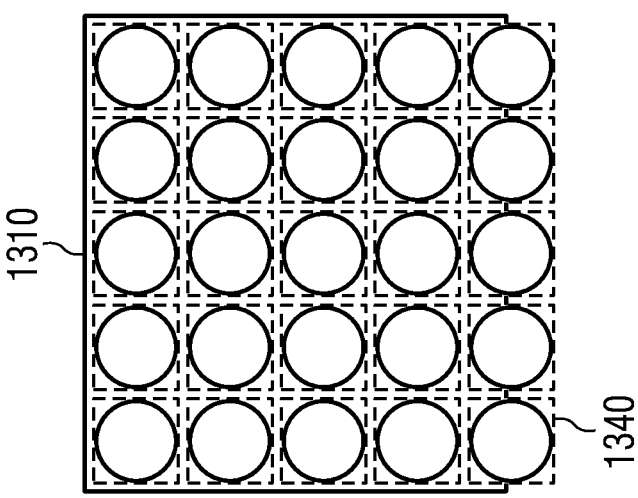
Figure 13A:
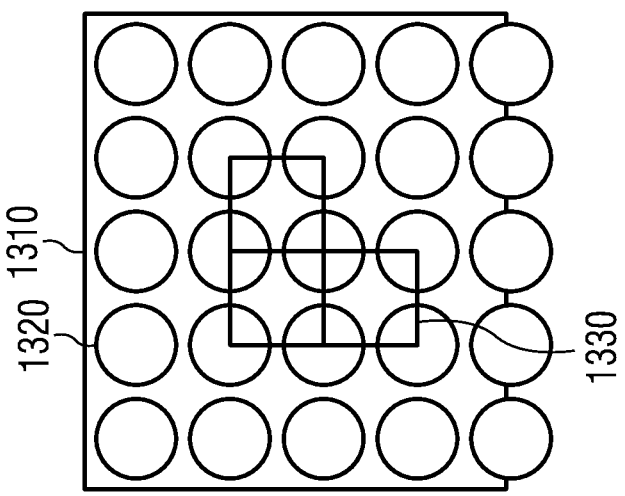

FIG. 13a-c shows an example of a trench arrangement with crystallographic etch process. FIG. 13a shows the substrate 1310 after the trench etch 1320 in a quadratic pattern 1330. A battery surface of ~ $2\pi r$~6.2 r may be obtained. Afterwards, the geometry of the trenches is adapted to a substantially quadratic geometry 1340 by a crystal dependent etch as shown in FIG. 13b. The resulting silicon Si matrix is shown in FIG. 13c. A battery surface of ~4*2r~8 r may be obtained. In this way, the power density of the battery element may be increased.

FIG. 14a-c shows another example of a trench arrangement with crystallographic etch process. FIG. 14a shows the substrate 1410 after the trench etch 1420 in a hexagonal pattern 1430. Afterwards, the geometry of the trenches is adapted to a substantially rectangular geometry 1440 by a crystal dependent etch as shown in FIG. 14b. The resulting silicon Si matrix is shown in FIG. 14c. In this way, the power density of the battery element may be increased.

More details and optional aspects of the method 1200 are described in connection with the proposed concept or one or more embodiments (e.g., FIG. 1-11) described above (e.g., substrate, dimension of trenches, solid state battery structure, electrodes, package).

For example, forming 1230 the solid state battery structures within the trenches may comprise forming a solid state electrolyte layer between a first electrode layer and a second electrode layer. The solid state electrolyte layer may comprise lithium phosphorus oxynitride. The first electrode layer may comprise an anode layer comprising carbon or silicon. The second electrode layer may comprise a cathode layer comprising lithium cobalt oxide and a collector layer comprising titan nitride.

For example, the trenches reach deeper into the substrate than 500 µm. The trenches may comprise an aspect ratio larger than 10. The trenches may comprise a maximal width of less than 300 µm. The trenches may comprise a distance to each other between 2 µm and 300 nm. The trenches may comprise a maximal depth larger than a maximal lateral dimension.

Figure 15:
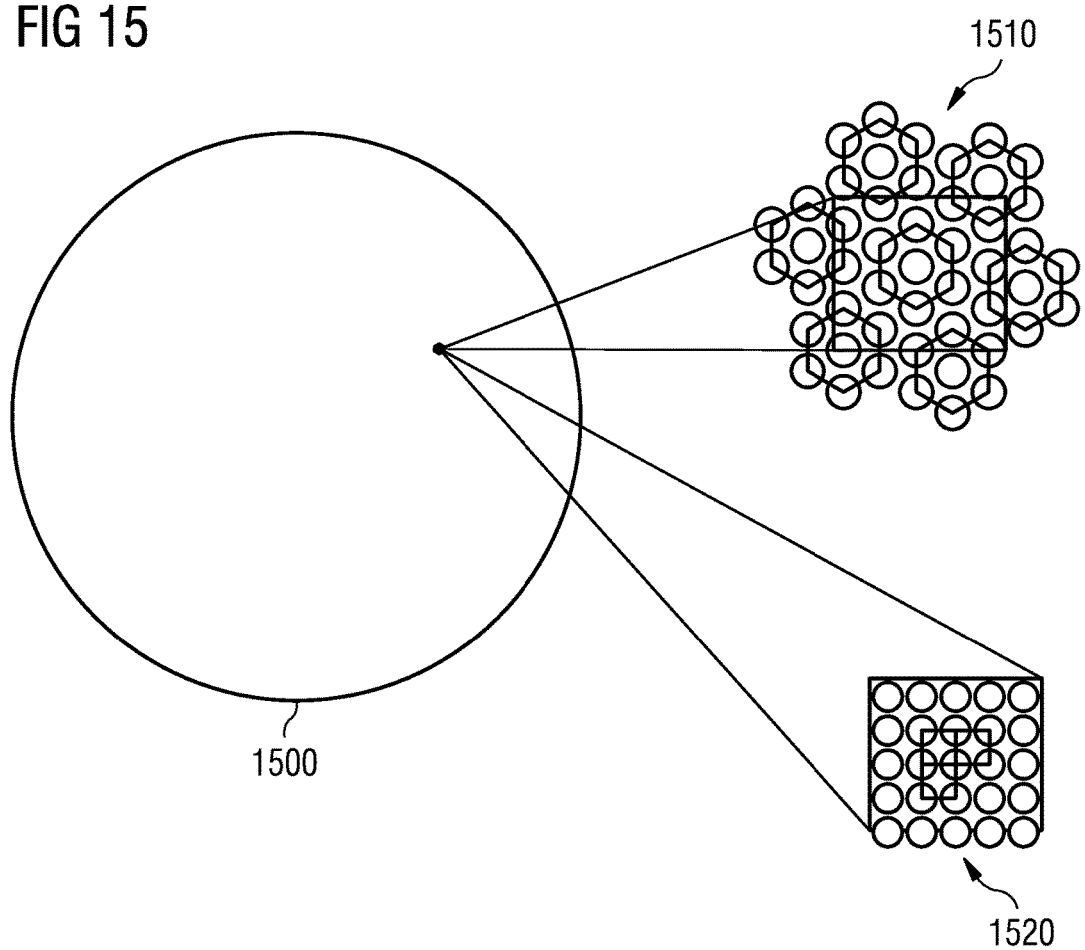
FIG. 15 shows a schematic top view of a wafer and two possible distributions of trenches.

For example, the substrate may be substantially a complete wafer. FIG. 15 shows a schematic illustration of a trench arrangement on a wafer 1500 for a wafer battery comprising trenches distributed over the wafer 1500 according to a hexagonal arrangement 1510 or a quadratic arrangement 1520.

FIG. 16a-b show a schematic illustration of a battery element 1600 according to an embodiment. The battery element 1600 comprises a substrate 1610 with a plurality of trenches 1620 reaching from a surface of the substrate 1610 into the substrate 1610. At least a part of each trench 1620 of the plurality of trenches 1620 is filled with a solid state battery structure 1630. The trenches 1620 of the plurality of trenches 1620 comprise a substantially rectangular shape or quadratic shape at the surface of the substrate 1610.

By implementing trenches with a rectangular shape or quadratic shape, a very dense distribution or packing of the trenches may be achievable. In this way, the power density of the battery element and a battery using such battery elements may be increased.

More details and optional aspects of the battery element 1600 are described in connection with the proposed concept or one or more embodiments (e.g., FIG. 1-15) described above (e.g., substrate, dimension of trenches, solid state battery structure, electrodes, package, shapes, distribution patterns). In other words, the battery element 1600 may comprise one or more optional additional features corresponding to one or more aspects described in connection with the proposed concept or one or more embodiments (e.g., FIG. 1-15) described above.

For example, the battery element 1600 may comprise a first battery element electrode electrically connected to a first electrode of the solid state battery structures 1630 within the plurality of trenches 1620 and a second battery element electrode electrically connected to a second electrode of the solid state battery structures 1630 within the plurality of trenches 1620.

Optionally, the substrate 1610 is at least more than half of a wafer, for example.

FIG. 17 shows a schematic cross section of a battery 1700 according to an embodiment. The battery 1700 comprises a plurality of wafers 1710 arranged in a stacked manner. Each wafer 1710 comprises battery structures.

By stacking a plurality of wafers with battery structures arranged within trenches, a battery providing a desired voltage or desired capacity may be feasible. The battery elements may be stacked with low effort. In this way, a battery with high power density may be provided.

Optionally, the battery structures may be solid state battery structures. Alternatively, the battery structures may be polymer battery structures or gel battery structures, for example.

Optionally, the battery structures may be arranged within trenches reaching into the respective wafer. Alternatively, the battery structures may be deposited on a substantially flat surface of the respective wafer, for example.

The stack of wafers 1710 may be arranged within a package 1720 of the battery 1700. At least two externally accessible battery electrodes 1730 may reach through the package 1720 to provide a battery voltage to an external device.

More details and optional aspects of the battery 1700 are described in connection with the proposed concept or one or more embodiments (e.g., FIG. 1-16) described above (e.g., substrate, dimension of trenches, solid state battery structure, electrodes, package). In other words, the battery 1700 may comprise one or more optional additional features corresponding to one or more aspects described in connection with the proposed concept or one or more embodiments (e.g., FIG. 1-16) described above.

Some embodiments relate to a wafer battery with high energy density. A proposed battery design may enable to get a high or the highest possible energy density.

In contrast to multiple stacking of laminates, e.g., on a role, where the resistance of one electrode layer is increased with the number of stacked laminates on the role, a 3-dimensional structure on a wafer matrix is proposed as silicon-based wafer battery (e.g., with two electrode on both sides of the wafer), for example. The battery layers can be arranged 3-dimensional. In this case, the surface for the battery-layers may be increased or maximized, for example.

For example, it is proposed to use crystal oriented Si-etching techniques to achieve a low or minimum silicon matrix volume for high or maximum battery laminate surface. For example, KOH or NH$_4$OH or other crystal dependent etches may be used to form a grid of Silicon as matrix for the battery layer depositions.

A proposed battery may be formed with a wafer, where the Si matrix is modified by crystal-oriented etch processes to form a high or maximum of surface with low or a minimum of stable Silicon volume.

A dense or optimum arrangement of trenches on the surface of the wafer battery may be either hexagonal or quadratic, for example.

With crystallographic etches, the battery layer surface may be increased without changing the minimum thickness between two trenches and without changing the wafer size by more than 20%, for example. In some applications, the power density is not sacrificed, for example.

Example embodiments may further provide a computer program having a program code for performing one of the above methods, when the computer program is executed on a computer or processor. A person of skill in the art would readily recognize that steps of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A battery element comprising:
   a substrate with a plurality of trenches extending into the substrate, wherein at least a part of each trench of the plurality of trenches is filled with a solid state battery structure;
   a front side battery element electrode arranged at a front side of the substrate and electrically connected within the plurality of trenches to a first electrode layer of the solid state battery structures; and
   a backside battery element electrode arranged at a backside of the substrate and electrically connected to a second electrode layer of the solid state battery structures within the plurality of trenches, wherein the front side battery element electrode is separated from the backside battery element electrode by at least the solid state battery structures,
wherein the trenches of the plurality of trenches extend from the front side of the substrate to the backside of the substrate, and
wherein the solid state battery structures extend from the front side of the substrate to the backside of the substrate within the trenches.

2. The battery element of claim 1, wherein the front side battery element electrode extends along at least a half of the front side of the substrate.

3. The battery element of claim 1, wherein the backside battery element electrode extends along at least a half of the backside of the substrate.

4. The battery element of claim 1, wherein the front side battery element electrode and the backside battery element electrode comprise copper.

5. The battery element of claim 1, wherein the solid state battery structures within the trenches comprise a solid state electrolyte layer between the first electrode layer and the second electrode layer.

6. The battery element of claim 5, wherein the solid state electrolyte layer comprises lithium phosphorus oxynitride.

7. The battery element of claim 4, wherein the first electrode layer comprises an anode layer comprising carbon or silicon.

8. The battery element of claim 4, wherein the second electrode layer of the solid state battery structures is located between the first electrode layer of the solid state battery structures and the backside battery element electrode at the backside of the substrate.

9. The battery element of claim 1, wherein the substrate comprises a thickness of more than 500 µm.

10. The battery element of claim 1, wherein trenches of the plurality of trenches comprise an aspect ratio larger than 10.

11. The battery element of claim 1, wherein trenches of the plurality of trenches comprise a maximal width of less than 300 µm.

12. The battery element of claim 1, wherein a distance between adjacent trenches of the plurality of trenches is between 2 µm and 300 nm.

13. The battery element of claim 1, wherein at least a portion of the solid state battery structure contacts walls within each trench of the plurality of trenches.

14. The battery element of claim 1, wherein the substrate is a wafer.

15. The battery element of claim 1, wherein the front side battery element electrode is electrically connected within the plurality of trenches in a continuous manner.

16. A battery comprising a plurality of battery elements arranged in a stacked manner, wherein each battery element comprises:
a substrate with a plurality of trenches extending into the substrate, wherein at least a part of each trench of the plurality of trenches is filled with a solid state battery structure;
a front side battery element electrode arranged at a front side of the substrate and electrically connected within the plurality of trenches to a first electrode layer of the solid state battery structures;
a backside battery element electrode arranged at a backside of the substrate and electrically connected to a second electrode layer of the solid state battery structures within the plurality of trenches; and
an electrolyte between the first and second electrode layers for ion conductivity between the first and second electrode layers,
wherein the front side battery element electrode is separated from the backside battery element electrode by at least the solid state battery structures,
wherein the trenches of the plurality of trenches extend from the front side of the substrate to the backside of the substrate, and
wherein the solid state battery structures extend from the front side of the substrate to the backside of the substrate within the trenches.

17. A method for forming a battery, the method comprising:
etching trenches into a substrate;
forming a solid state battery structure within the trenches;
forming a front side battery element electrode arranged at a front side of the substrate and electrically connected within the trenches to a first electrode layer of the solid state battery structure;
thinning the substrate from a backside of the substrate after forming the solid state battery structure within the trenches until the solid state battery structure is uncovered at the backside of the substrate;
forming a backside battery element electrode arranged at a backside of the substrate and electrically connected to a second electrode layer of the solid state battery structure within the trenches; and
providing an electrolyte between the first and second electrode layers for ion conductivity between the first and second electrode layers,
wherein the front side battery element electrode is separated from the backside battery element electrode by at least the solid state battery structures.

18. The method of claim 17, further comprising stacking a plurality of battery elements so that electrodes of neighboring battery elements are in contact with each other.

* * * * *